US012726873B2

(12) United States Patent
Onoda et al.

(10) Patent No.: US 12,726,873 B2
(45) Date of Patent: Sep. 1, 2026

(54) APPARATUS, COMMUNICATION CONTROLLING METHOD, AND NON-TRANSITORY COMPUTER-READABLE STORAGE MEDIUM

(71) Applicant: Yamaha Corporation, Hamamatsu (JP)

(72) Inventors: Akihisa Onoda, Hamamatsu (JP); Hirokazu Suzuki, Yokohama (JP)

(73) Assignee: Yamaha Corporation, Hamamatsu (JP)

( * ) Notice: Subject to any disclaimer, the term of this patent is extended or adjusted under 35 U.S.C. 154(b) by 330 days.

(21) Appl. No.: 18/613,359

(22) Filed: Mar. 22, 2024

(65) Prior Publication Data

US 2024/0323791 A1 Sep. 26, 2024

(30) Foreign Application Priority Data

Mar. 23, 2023 (JP) ................................ 2023-046781

(51) Int. Cl.
*H04W 36/30* (2009.01)

(52) U.S. Cl.
CPC ................................ *H04W 36/302* (2023.05)

(58) Field of Classification Search
CPC .................................................. H04W 36/302
See application file for complete search history.

(56) References Cited

U.S. PATENT DOCUMENTS

2003/0108009 A1* 6/2003 Petersen ............... H04W 12/64 370/332
2015/0358979 A1* 12/2015 Puranik ............... H04W 72/542 455/452.2
2016/0072573 A1* 3/2016 Tohzaka ............ H04B 7/15507 370/315

FOREIGN PATENT DOCUMENTS

JP 2018-182412 A 11/2018

* cited by examiner

*Primary Examiner* — Mohammad S Anwar
(74) *Attorney, Agent, or Firm* — Crowell & Moring LLP

(57) ABSTRACT

An apparatus includes a control device having a controller that obtains a first signal transmitted from a communication terminal connected to a first wireless relaying device. The controller also obtains a second signal transmitted from the communication terminal to a second wireless relaying device different from the first wireless relaying device. Based on a relationship between a signal strength of the second signal and a predetermined first threshold of a signal strength of the first signal, the controller changes the first threshold to a second threshold different from the first threshold. Based on a relationship between the second threshold and the signal strength of the first signal, the controller transmits, to the communication terminal, first information regarding connection switching.

19 Claims, 14 Drawing Sheets

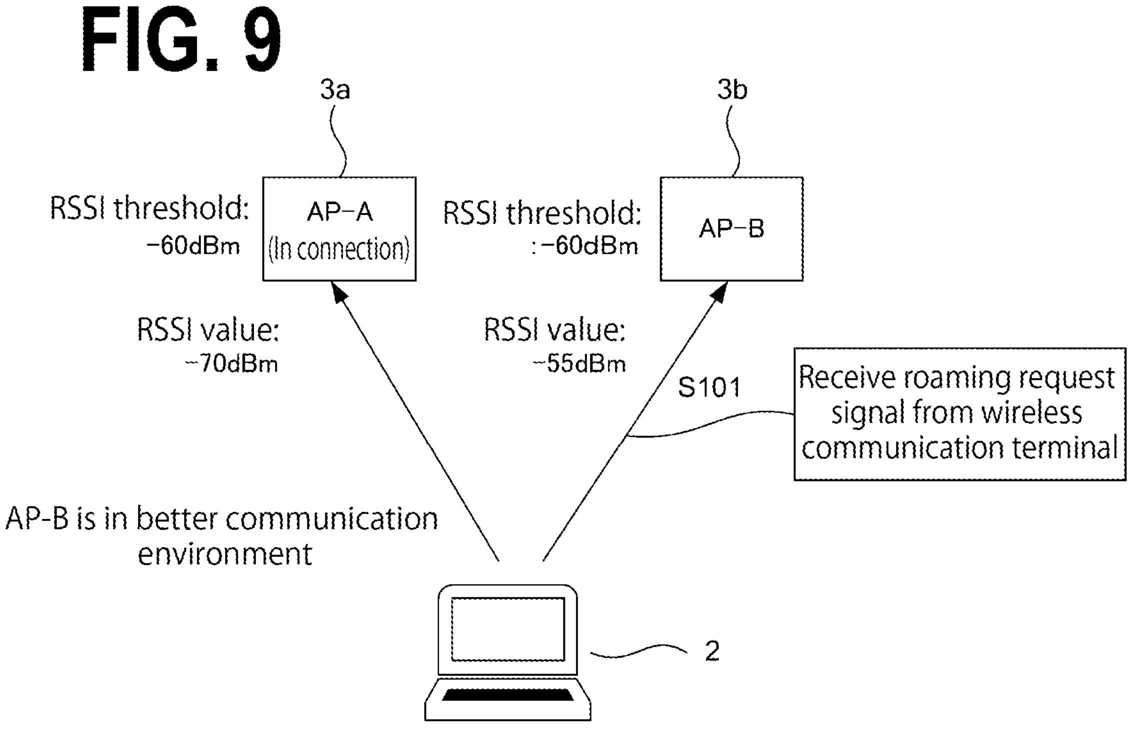
FIG. 9
3a
3b
RSSI threshold: −60dBm
AP−A (In connection)
RSSI threshold: :−60dBm
AP−B
RSSI value: −70dBm
RSSI value: −55dBm
S101
Receive roaming request signal from wireless communication terminal
AP-B is in better communication environment
2

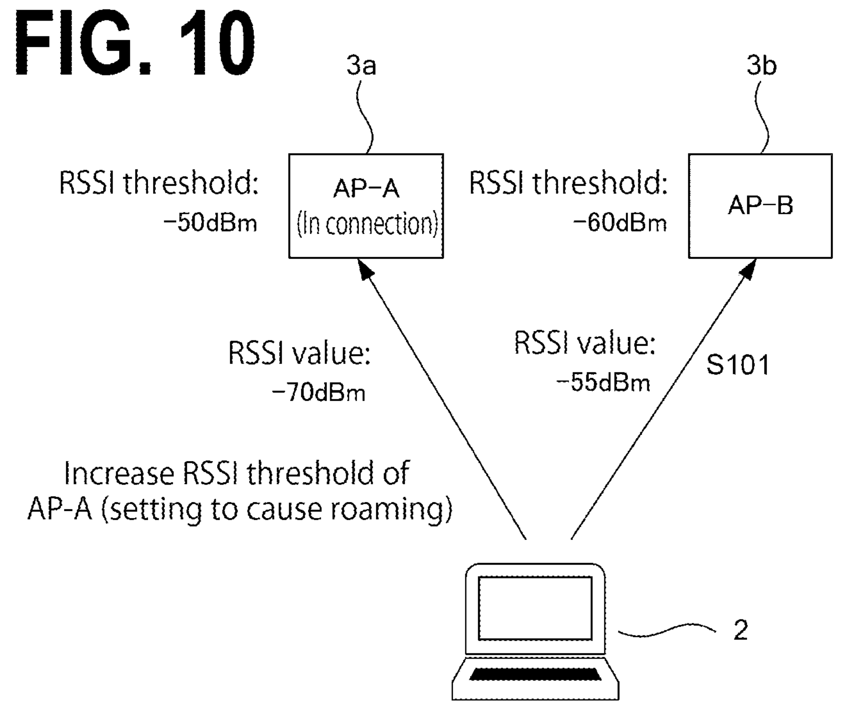
FIG. 10
3a
3b
RSSI threshold: −50dBm
AP−A (In connection)
RSSI threshold: −60dBm
AP−B
RSSI value: −70dBm
RSSI value: −55dBm
S101
Increase RSSI threshold of AP-A (setting to cause roaming)
2

Start
S401
Obtain RSSI (RSSI 3a) of signal received by AP-A
S4021
Obtain number of connection demands from wireless communication terminal to AP-B per unit time
S4023
Number of roaming demands per unit time > predetermined number?
No
Yes
404
Setting to stop roaming
S403
RSSI (RSSI 3a) of AP-A < RSSI threshold (RSSIth 3a) of AP-A?
No
Yes
S405
Transmit instruction to switch from AP-A to AP-B
End

APPARATUS, COMMUNICATION CONTROLLING METHOD, AND NON-TRANSITORY COMPUTER-READABLE STORAGE MEDIUM

CROSS-REFERENCE TO RELATED APPLICATIONS

The present application claims priority under 35 U.S.C. § 119 to Japanese Patent Application No. 2023-046781, filed Mar. 23, 2023. The contents of this application are incorporated herein by reference in their entirety.

BACKGROUND

The present disclosure relates to a control device, a communication controlling method, and a non-transitory computer-readable storage medium.

Roaming is a technique that enables a client to switch from one access point to another access point to establish reliable communication. Roaming operates mainly when wireless communication terminals move. In roaming processing, it is necessary to temporarily disconnect a client communication terminal from the current access point and connect the client communication terminal to a new access point. For example, if there is a delay in roaming while the client communication terminal is in motion, the client communication terminal remains connected to the current access point. This could potentially lead to unreliable communication. In this context, JP 2018-182412A discloses the utilization of a threshold for received signal strength (Received Signal Strength Indicator, RSSI) during the process of switching connections.

In some applications, however, the timing of roaming is managed by the client, and an administrator can not arbitrarily control when roaming occurs. If the roaming timing lags behind the optimal timing, the client communication terminal could remain connected to a distant access point. This may lead to unreliable communication. It is, however, difficult to set in advance an optimal threshold for each communication terminal.

An object of the present disclosure is to establish reliable wireless communication irrespective of environmental conditions.

SUMMARY

One aspect is an apparatus that includes a control device having a controller configured to obtain a first signal transmitted from a communication terminal connected to a first wireless relaying device. The controller is also configured to obtain a second signal transmitted from the communication terminal to a second wireless relaying device different from the first wireless relaying device. Based on a relationship between a signal strength of the second signal and a predetermined first threshold of a signal strength of the first signal, the controller is also configured to change the first threshold to a second threshold different from the first threshold. Based on a relationship between the second threshold and the signal strength of the first signal, the controller is also configured to transmit, to the communication terminal, first information regarding connection switching.

Another aspect is a computer-implemented communication controlling method that includes obtaining a first signal transmitted from a communication terminal connected to a first wireless relaying device. The method also includes obtaining a second signal transmitted from the communication terminal to a second wireless relaying device different from the first wireless relaying device. The method also includes, based on a relationship between a signal strength of the second signal and a predetermined first threshold of a signal strength of the first signal, changing the first threshold to a second threshold different from the first threshold. The method also includes, based on a relationship between the second threshold and the signal strength of the first signal, transmitting, to the communication terminal, first information regarding connection switching.

Another aspect is a non-transitory computer-readable storage medium that stores a program. When the program is executed by at least one processor, the program causes the at least one processor to obtain a first signal transmitted from a communication terminal connected to a first wireless relaying device. The program also causes the at least one processor to obtain a second signal transmitted from the communication terminal to a second wireless relaying device different from the first wireless relaying device. The program also causes the at least one processor to, based on a relationship between a signal strength of the second signal and a predetermined first threshold of a signal strength of the first signal, change the first threshold to a second threshold different from the first threshold. The program also causes the at least one processor to, based on a relationship between the second threshold and the signal strength of the first signal, transmit, to the communication terminal, first information regarding connection switching.

A more complete appreciation of the present disclosure and many of the attendant advantages thereof will be readily obtained as the same becomes better understood by reference to the following detailed description when considered in connection with the following figures, in which:

BRIEF DESCRIPTION OF THE DRAWINGS

FIG. 9 is a conceptual diagram illustrating operation example 2;

FIG. 10 is a conceptual diagram illustrating operation example 2;

DETAILED DESCRIPTION

Figure 1:
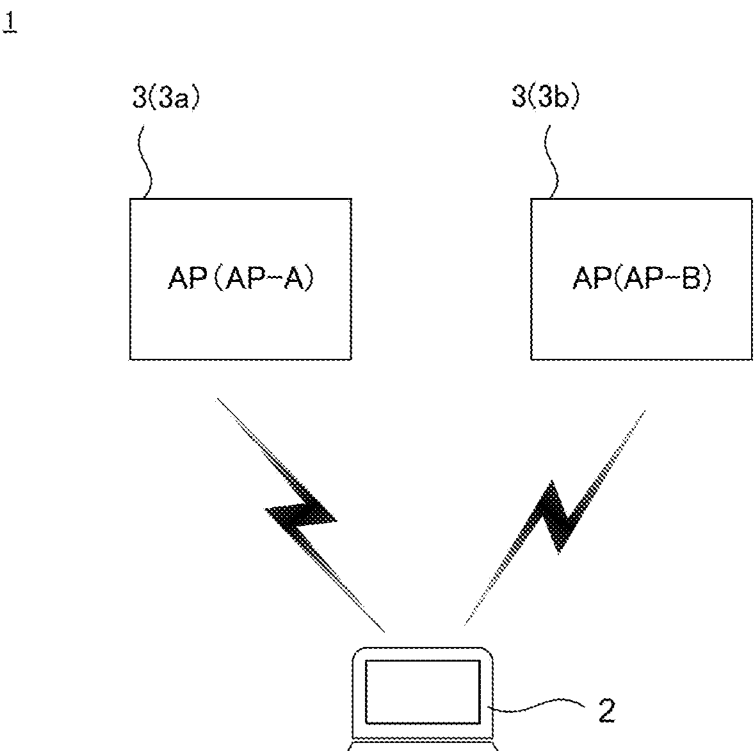
FIG. 1 is a conceptual diagram illustrating a wireless communication system.

The present specification is applicable to an apparatus, a communication controlling method, and a non-transitory computer-readable storage medium.

Embodiments will be described in detail by referring to the accompanying drawings. The embodiments presented below serve as illustrative examples of the present disclosure and are not intended to limit the scope of the present disclosure. In the accompanying drawings referenced in the embodiments, similar reference numerals, characters, or symbols may be used to indicate corresponding or identical elements. For example, to distinguish like elements, "A" may be appended to a reference numeral and "B" may be appended to the same reference numeral.

By referring to FIG. 1, a wireless communication system 1 will be described. FIG. 1 is a conceptual diagram illustrating the wireless communication system 1. As illustrated in FIG. 1, the wireless communication system 1 includes a wireless communication terminal 2 (also referred to as communication terminal 2) and wireless relaying devices **3*a* and 3*b*. In the following description, in a context where the wireless relaying devices 3*a* and 3*b* need not be distinguished from each other, the wireless relaying devices 3*a* and 3*b* will be simply referred to as "wireless relaying device 3**".

The wireless communication terminal 2 may be a mobile communication terminal such as a multi-functional mobile phone (also referred to as smartphone), a mobile phone, and a PDA (Personal Digital Assistant). The wireless communication terminal 2 may also be an information processing terminal device that has a communication function and an arithmetic operation function. An example of such information processing terminal is a personal computer. Also, the wireless communication terminal 2 includes element such as a CPU, a memory, and a communication controller that controls communication with the wireless relaying device 3. The wireless communication terminal 2 may also include a display device and an operation-input device such as a mouse, a keyboard, and a touch panel.

The wireless relaying device 3 according to this embodiment is an access point (AP) in a wireless LAN (Local Area Network). In the following description, the wireless relaying device **3*a* may occasionally be referred to as "AP-A", and the wireless relaying device 3*b* may occasionally be referred to as "AP-B". The wireless relaying device 3 may also be a router or firewall with a wireless LAN interface. Via the wireless relaying device 3, the wireless communication terminal 2** is communicable with other wireless communication terminals and/or connectable to other networks.

Figure 2:
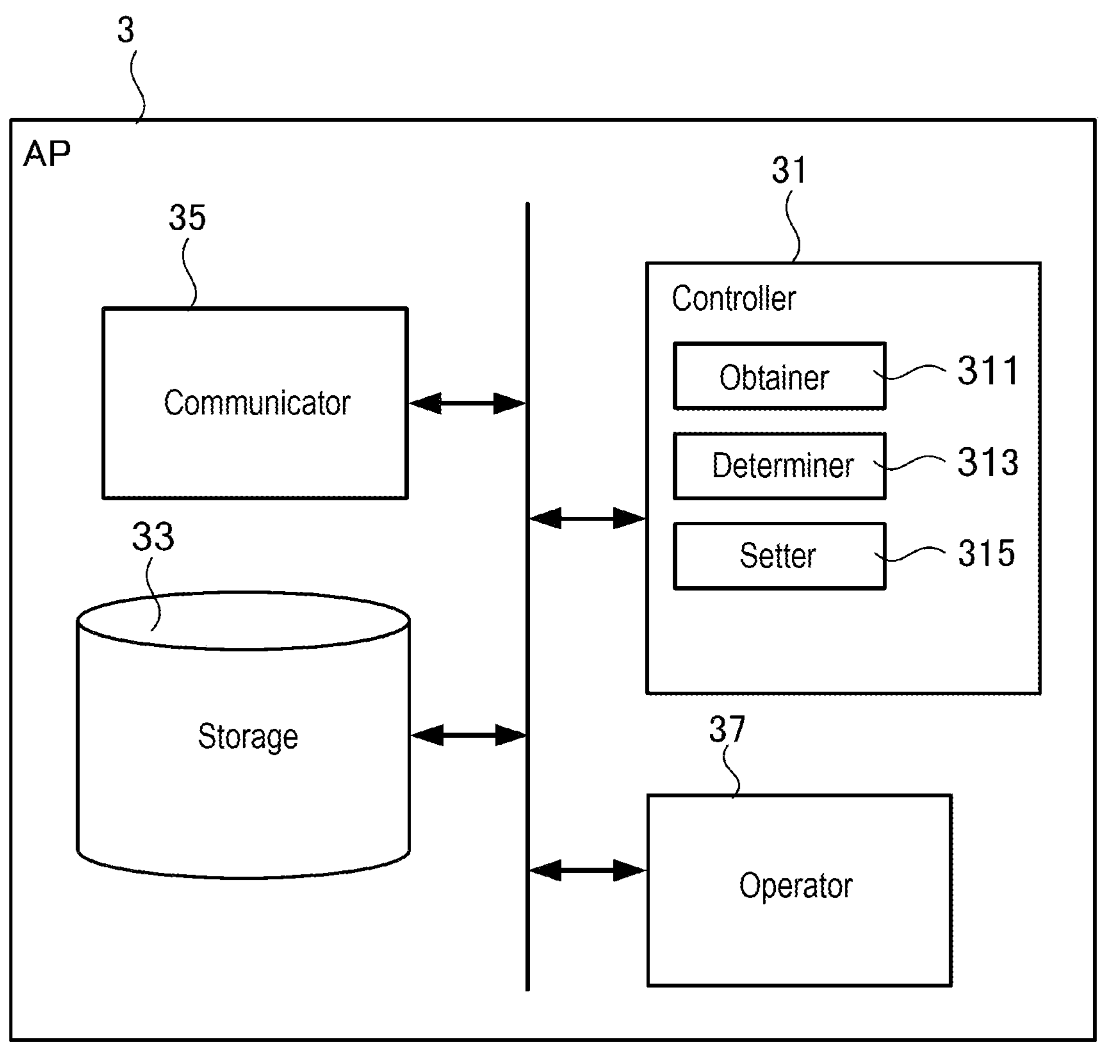
FIG. 2 is a block diagram illustrating a configuration of a wireless relaying device.

By referring to FIG. 2, the wireless relaying device 3 will be described. FIG. 2 is a block diagram illustrating a configuration of wireless relaying device 3.

As illustrated in FIG. 2, the wireless relaying device 3 includes a controller 31, a storage 33, a communicator 35, and an operator 37.

The storage 33 stores information such as various tables and control programs executed by the controller 31. The wireless relaying device 3 may include a device to read a recording medium. The storage 33 may be a storage device such as a nonvolatile memory and a hard disk. The storage 33 includes a storage area for the above-described programs and other application programs for implementing various functions. The storage 33 also includes a storage area for setting information obtained by processing such as setting processing. It suffices that each program is a computer-executable program. Specifically, each control program may be provided in the form of a computer readable recording medium such as a magnetic recording medium, an optical recording medium, a magneto-optical recording medium, and a semiconductor such as a memory. In this case, the wireless relaying device 3 may include a device to read a recording medium.

The operator 37 includes operation pieces such as a power source button and a setting button, receives a user's operation on the operation pieces, and outputs a signal based on the operation to the controller 31. The operator 37 may be implemented by an application program. Also, the operator 37 may not necessarily be provided.

The controller 31 sets, in the communicator 35, a channel from among channels in the 5 GHz frequency range. The communicator 35 uses the channel set by the controller 31 to establish communication with the wireless communication terminal 2. The channel set in the communicator 35 is selected from the channels included in types W52, W53, and W56 according to the IEEE 802.11 standards. These channels, however, are not intended in a limiting sense; for example, a communication band in the 2.4 HGz range may be set in the communicator 35.

The communicator 35 may transmit information other than frequency band information. Examples of such other information include identification information of the wireless relaying device 3, information regarding the number of wireless communication terminals 2 connected to the wireless relaying device 3, information regarding channel usage rate of the wireless relaying device 3, information regarding traffic of the wired side of the wireless relaying device 3, and identification information of the wireless communication terminal 2.

The controller 31 includes a memory and an arithmetic processing circuit such as a CPU. The controller 31, at CPU, executes a communication control program stored in the storage 33 to implement various functions in the wireless relaying device 3. The functions implemented include a communication control function. This communication control function enables communication control processing, described later, to be performed.

The controller 31 also includes functional sections, namely, an obtainer 311, a determiner 313, and a setter 315.

The obtainer 311 has a function to obtain information stored in the storage 33 or various information transmitted from the wireless communication terminal 2. In this embodiment, the obtainer 311 obtains a communication signal or a roaming request signal transmitted from the wireless communication terminal 2. A roaming request signal is transmitted to the wireless relaying device 3 from multiple unspecified wireless communication terminals 2. The roaming request signal may include an identifier to identify a particular wireless relaying device 3.

The determiner 313 has a function to perform determination (comparison) processing based on obtained information. In this embodiment, the determiner 313 compares the signal strength of the signal that the wireless relaying device **3*b* receives from the wireless communication terminal 2 with a threshold of the signal strength of the signal that the wireless relaying device 3*a* receives from the wireless communication terminal 2. The receive strength is displayed in RSSI (Received Signal Strength Indication, Received Signal Strength Indicator). The signal strength of the signal that the wireless relaying device 3***a* receives from the wireless communication terminal 2 will be denoted as "RSSI 3*a*". The signal strength of the signal that the wireless relaying device 3*b* receives from the wireless communication terminal 2 will be denoted as "RSSI 3*b*". The threshold of the signal strength of the signal that the wireless relaying device 3*a* receives from the wireless communication terminal 2 will be denoted as RSSIth 3*a*. It is to be noted that a threshold of a predetermined RSSI may be kept in a server on a network or may be stored in the storage 33.

The setter 315 sets various kinds of information based on a determination (comparison) result. In this embodiment, the comparison result is obtained by the comparison of the signal strength of the signal that the wireless relaying device 3*b* receives from the wireless communication terminal 2 with the threshold of the signal strength of the signal that the wireless relaying device 3*a* receives from the wireless communication terminal 2. Based on this comparison result, the setter 315 performs setting of increasing or decreasing the threshold.

It is to be noted that in this embodiment, the wireless relaying device 3*a* (AP-A), which is one wireless relaying device 3, performs communication control in the wireless communication system 1. The wireless relaying device 3*a* (AP-A), therefore, can also be regarded as a control device.

Figure 3:
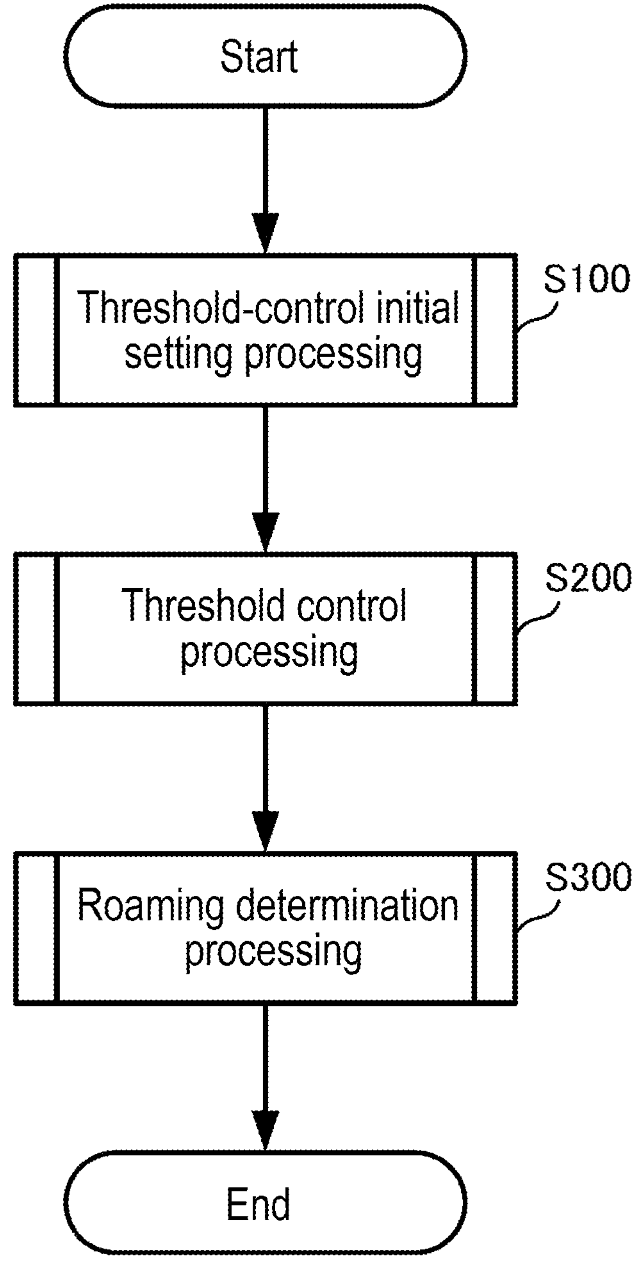
FIG. 3 is a flowchart of the communication control processing.

By referring to FIGS. 3 to 6, a communication controlling method performed by the wireless relaying device 3*a* (AP-A) will be described. FIG. 3 is a flowchart outlining the communication controlling method. The communication controlling method includes threshold-control initial setting processing S100, threshold control processing S200, and roaming determination processing S300. The threshold-control initial setting processing S100 determines a state of the wireless relaying device before threshold control, and sets the wireless relaying device into a threshold controllable state. The threshold control processing S200 compares the signal strength of the signal received by the wireless relaying device 3*b* with the threshold of the signal strength of the signal received by the wireless relaying device 3*a*; and based on the signal strength of the signal received by the wireless relaying device 3*b*, adjusts or changes the threshold of the signal strength of the signal received by the wireless relaying device 3*a*. Based on the signal strength of the signal received by the wireless relaying device 3*a*, the roaming determination processing S300 instructs the wireless communication terminal 2 to perform roaming processing. Each processing will be described in detail below.

Figure 4:
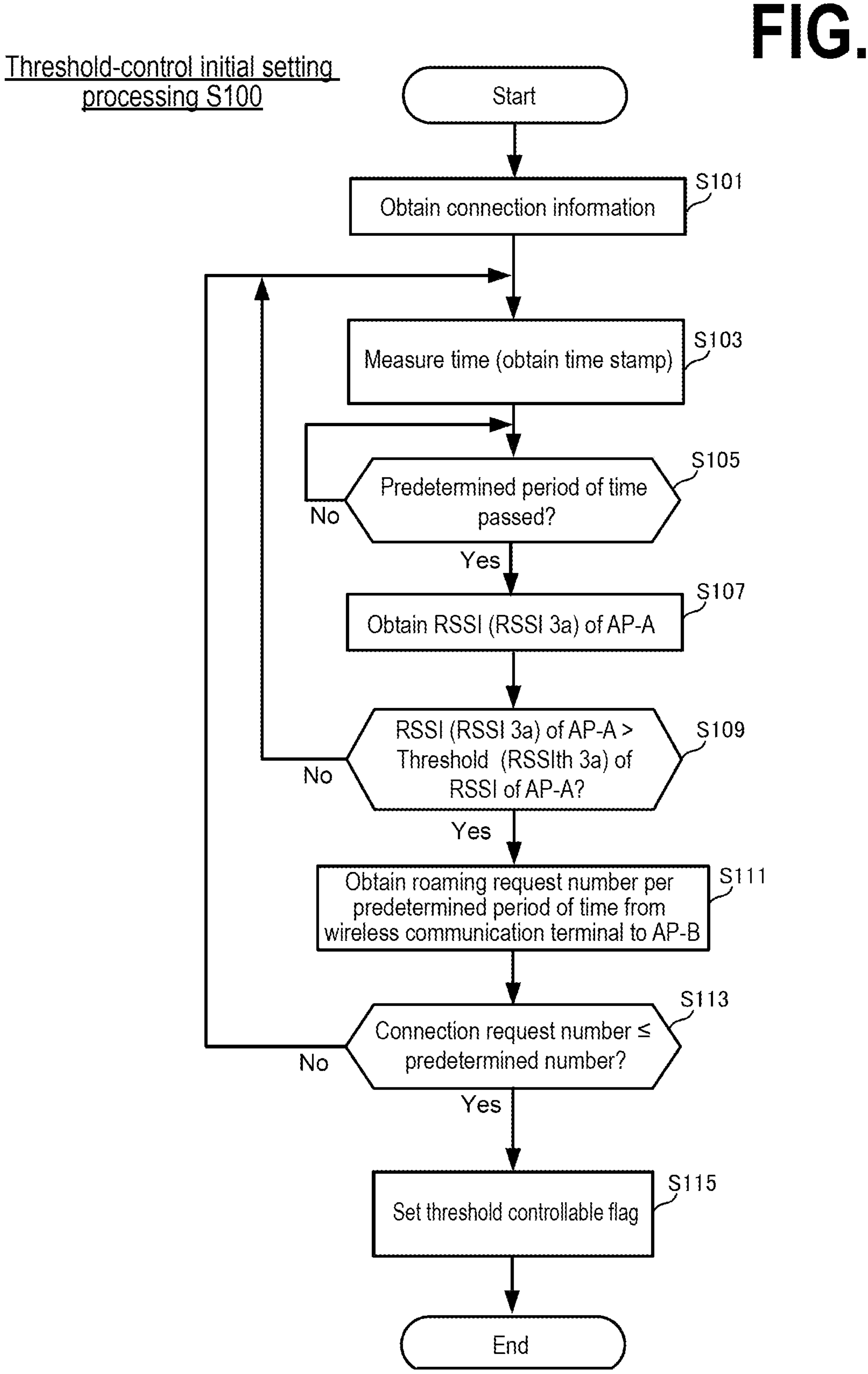
FIG. 4 is a flowchart of communication control processing.

FIG. 4 is a flowchart of the threshold-control initial setting processing S100.

In FIG. 4, the controller 31 of the wireless relaying device 3*a* obtains information (connection information) indicating that the wireless relaying device 3*a* and the wireless communication terminal 2 are connected to each other (step S101). Then, the controller 31 obtains the time of obtaining the connection information (that is, obtains a time stamp) to measure time (step S103). The procedure waits until a predetermined period of time passes (No at step S105). Upon passage of the predetermined period of time (Yes at step S105), the controller 31 obtains the signal strength RSSI 3*a* (step S107). The signal strength RSSI 3*a* is the strength of the signal transmitted from the wireless communication terminal 2 and received by the communicator 35 of the wireless relaying device 3*a*.

The controller 31 (determiner) determines whether the signal strength RSSI 3*a* of the received signal is greater than predetermined threshold RSSIth 3*a* (step S109). The threshold RSSIth 3*a* is the threshold of the signal strength of the signal that the wireless relaying device 3*a* receives from the wireless communication terminal 2. In a case where the signal strength RSSI 3*a* is lower than the threshold RSSIth 3*a* of the signal strength (No at step S109), the procedure returns to the processing at step S103. In a case where the signal strength RSSI 3*a* is higher than the threshold RSSIth 3*a* of the signal strength (Yes at step S109), the controller 31 obtains a connection request signal transmission number. The connection request signal transmission number is the number of times that connection demands have been transmitted from the wireless communication terminal 2 to the wireless relaying device 3*b* (step S111).

In a case where the connection request signal transmission number is larger than a predetermined transmission number (No at step S113), the procedure returns to the processing at step S103. In a case where the connection request signal transmission number is equal to or lower than the predetermined transmission number (Yes at step S113), the controller 31 sets a threshold controllable flag (step S115). Upon completion of step S115, the threshold-control initial setting processing S100 ends.

Figure 5:
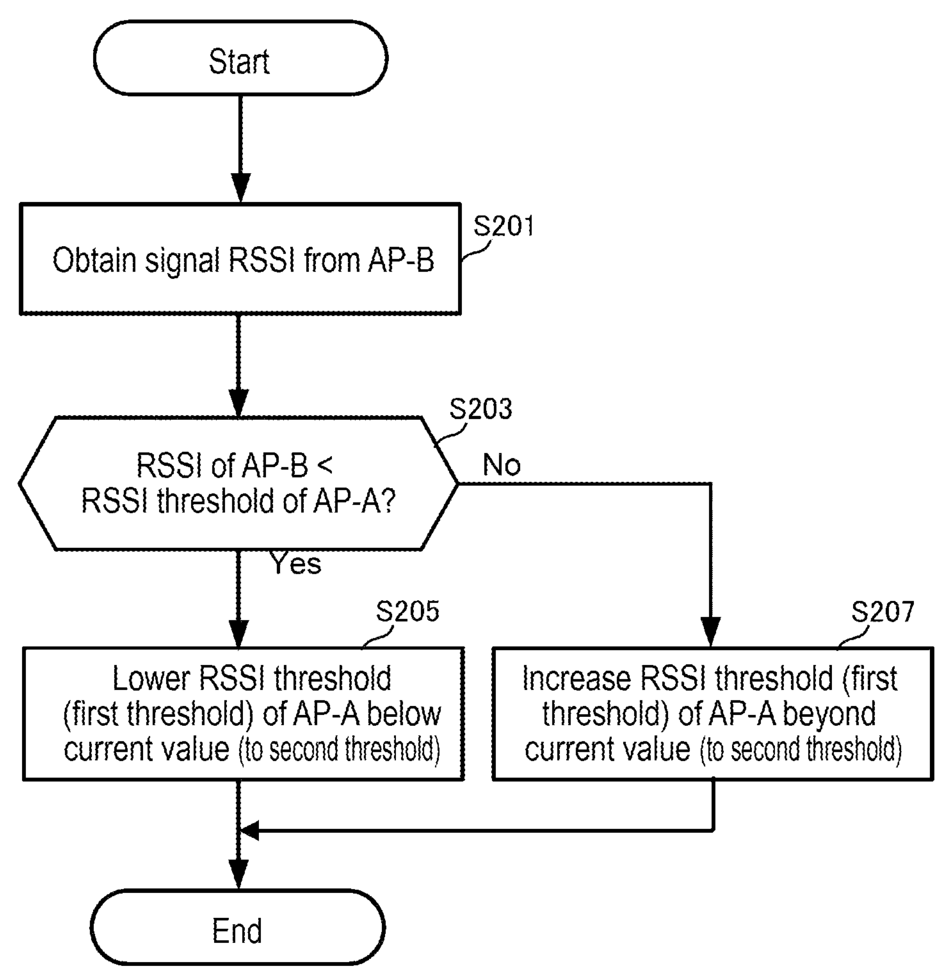
FIG. 5 is a flowchart of the communication control processing.

FIG. 5 is a flowchart of the threshold control processing S200, which is included in the communication controlling method performed by the wireless relaying device 3*a*.

First, the controller 31 of the wireless relaying device 3*a* obtains, from the wireless relaying device 3*b*, the signal strength RSSI 3*b* of the connection request signal transmitted from the wireless communication terminal 2 to the wireless relaying device 3*b* (step S201).

Next, the controller 31 compares the signal strength RSSI 3*b* of the signal received by the wireless relaying device 3*b* with the threshold RSSIth 3*a* of the signal strength of the signal received by the wireless relaying device 3*a* (step S203). A case where the signal strength RSSI 3*b* (which is associated with the wireless relaying device 3*b*) is lower than the threshold RSSIth 3*a* of the signal strength RSSI 3*a* (which is associated with the wireless relaying device 3*a*) is equivalent to a case of a poor communication environment. In this case, the controller 31 prevents roaming to the wireless relaying device 3*b*. Specifically, the controller 31 lowers the current value of the threshold RSSIth 3*a* of the signal strength RSSI 3*a* (which is associated with the wireless relaying device 3*a*) (for example, lowers the current threshold RSSIth 3*a* from −60 dBm to −70 dBm) (step S205).

A case where the signal strength RSSI 3*b* (which is associated with the wireless relaying device 3*b*) is higher than the threshold RSSIth 3*a* of the signal strength RSSI 3*a* (which is associated with the wireless relaying device 3*a*) is equivalent to a case of a good communication environment. In this case, the controller 31 promotes roaming to the wireless relaying device 3*b*. Specifically, the controller 31 increases the current value of the threshold RSSIth 3*a* of the signal strength RSSI 3*a* (which is associated with the wireless relaying device 3*a*) (for example, increases the current threshold RSSIth from −60 dBm to −50 dBm) (step S207). Upon completion of S207, the threshold control processing S200 ends.

Figure 6:
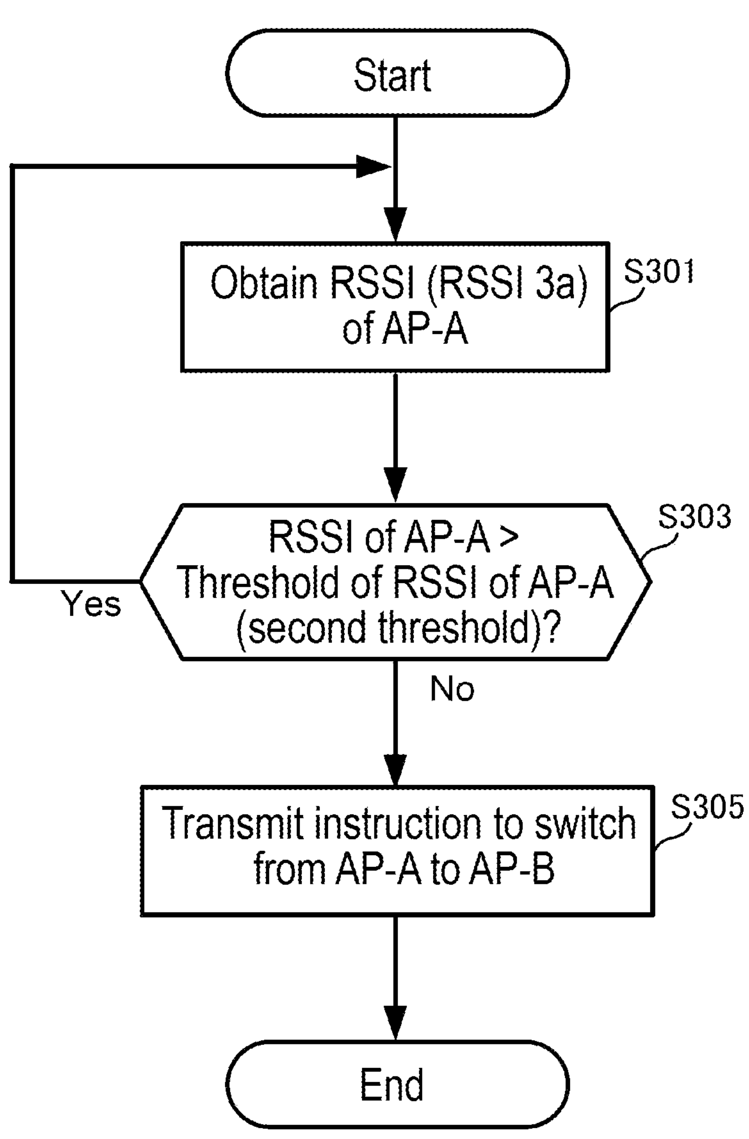
FIG. 6 is a flowchart of the communication control processing.

FIG. 6 is a flowchart of the roaming determination processing S300. As illustrated in FIG. 6, the controller 31 of the wireless relaying device 3*a* obtains the signal strength RSSI 3*a* of the signal transmitted from the wireless communication terminal 2 to the wireless relaying device 3*a* (signal at the wireless relaying device 3*a*) (step S301). This signal strength RSSI 3*a* may be a value already obtained or may be a value obtained again. The controller 31 compares the signal strength RSSI 3*a* (which is associated with the wireless relaying device 3*a*) with the threshold RSSIth 3*a* of the signal strength RSSI 3*a* (which is associated with the wireless relaying device 3*a*) (step S303).

In a case where the signal strength RSSI 3*a* (which is associated with the wireless relaying device 3*a*) is higher than the threshold RSSIth 3*a* of the signal strength RSSI 3*a* (which is associated with the wireless relaying device 3*a*) (Yes at step S303), the procedure returns to step S301 without roaming. In a case where the signal strength RSSI 3*a* (which is associated with the wireless relaying device 3*a*) is lower than the threshold RSSIth 3*a* of the signal strength RSSI 3*a* (which is associated with the wireless relaying device 3*a*) (No at step S303), the controller 31 transmits instruction information (also referred to as first information) to the wireless relaying device 3*b* (step S305). The instruction information is for switching connection from the wireless relaying device 3*a* (AP-A) to the wireless relaying device 3*b* (AP-B). Upon completion of S305, the roaming determination processing S300 ends, and the communication control processing according to this embodiment ends. While in the first embodiment the wireless relaying device 3*a* (AP-A) has been described as performing the communication control processing, the wireless relaying device 3*b* (AP-B) performs similar communication control processing.

In this embodiment, the threshold of the signal strength RSSI of an obtained signal is adjusted, and the wireless relaying device (access point) to be connected is automatically controlled. Specifically, if the RSSI decreases in the access point to which a wireless communication terminal is currently connected, the connection is cut, and the wireless communication terminal is connected to a new access point. This configuration of the first embodiment ensures that in a poor communication environment, the wireless communication terminal is switched connection to secure more reliable communication.

In the above description, the controller 31 compares the signal strength RSSI 3*b* (which is associated with the wireless relaying device 3*b*) with the threshold RSSIth 3*a* of the signal strength RSSI 3*a* (which is associated with the wireless relaying device 3*a*). This configuration, however, is not intended in a limiting sense. The controller 31 may compare the signal strength RSSI 3*b* (which is associated with the wireless relaying device 3*b*) with the signal strength RSSI 3*a* (which is associated with the wireless relaying device 3*a*), in addition to the comparison of the signal strength RSSI 3*b* (which is associated with the wireless relaying device 3*b*) with the threshold RSSIth 3*a* of the signal strength RSSI 3*a* (which is associated with the wireless relaying device 3*a*). Even though the signal strength RSSI 3*b* (which is associated with the wireless relaying device 3*b*) is higher than the threshold RSSIth 3*a* of the signal strength RSSI 3*a* (which is associated with the wireless relaying device 3*a*), the threshold RSSIth 3*a* may not necessarily be changed if the signal strength RSSI 3*b* (which is associated with the wireless relaying device 3*b*) is lower than the signal strength RSSI 3*a* (which is associated with the wireless relaying device 3*a*). This eliminates or minimizes repetition of roaming.

Operation examples of the wireless relaying device 3 in particular conditions will be described.

Figure 7:
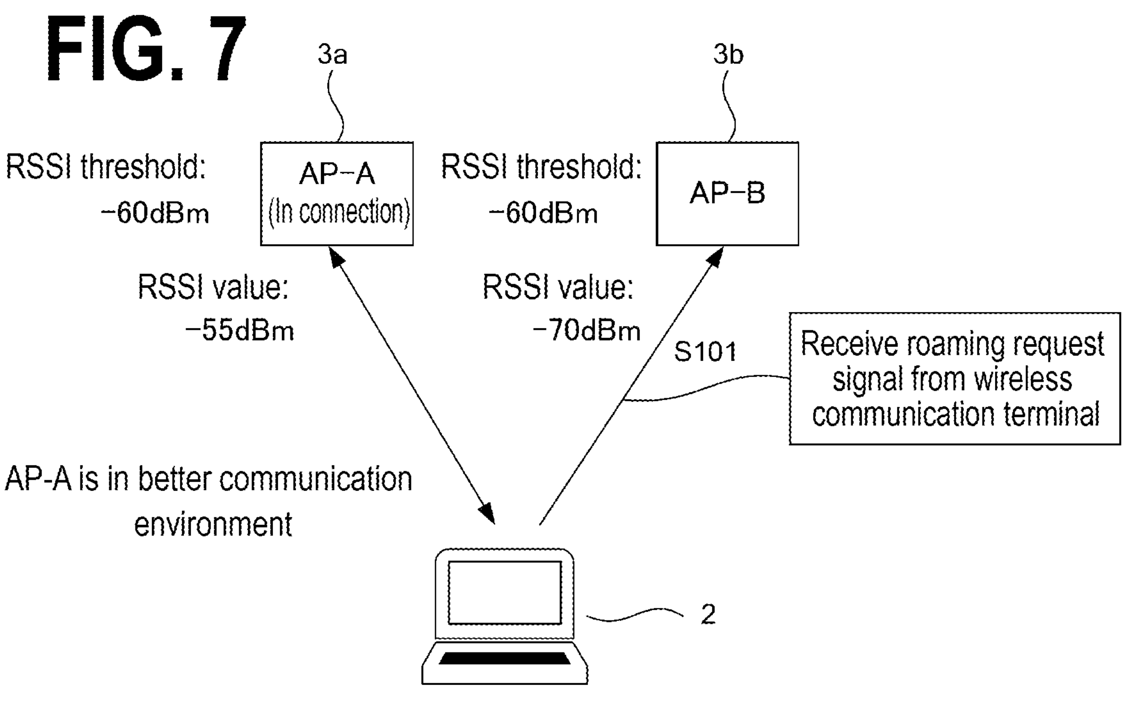
FIG. 7 is a conceptual diagram illustrating operation example 1.
Figure 8:
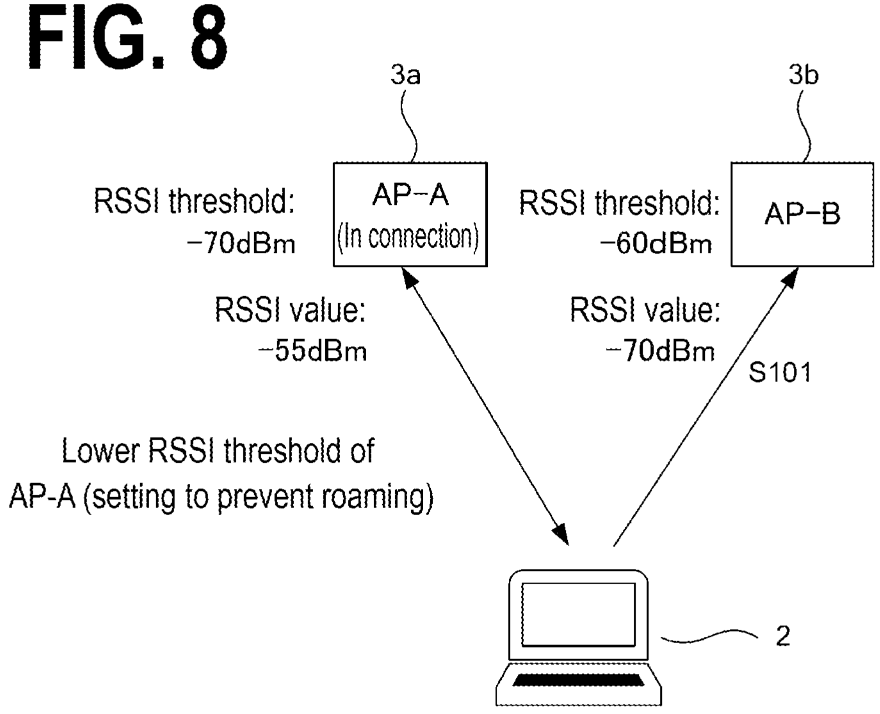
FIG. 8 is a conceptual diagram illustrating operation example 1.

Operation example 1 of the wireless relaying device 3 (control device) will be described by referring to FIGS. 7 and 8. In operation example 1, the RSSI value of a connection request signal that a non-connected wireless relaying device receives from the wireless communication terminal is lower than a predetermined RSSI threshold. FIGS. 7 and 8 are conceptual diagrams illustrating part of the operations performed by the wireless relaying device 3.

The RSSI threshold associated with the wireless relaying device 3*a* (AP-A) and the RSSI threshold associated with the wireless relaying device 3*b* (AP-B) are predetermined as −60 dBm. The wireless relaying device 3*a* (AP-A) is connected to the wireless communication terminal 2. The wireless relaying device 3*a* (AP-A) and the wireless relaying device 3*b* (AP-B) receive signals transmitted from the wireless communication terminal 2. Specifically, the wireless relaying device 3*a* (AP-A) receives a wireless communication signal from the wireless communication terminal 2. The wireless relaying device 3*b* (AP-B) receives a connection request signal from the wireless communication terminal 2.

The controller 31 of the wireless relaying device 3*a* (AP-A) determines whether the RSSI value of a connection request signal that the wireless relaying device 3*b* (AP-B) received from the wireless communication terminal 2 is equal to or higher than the predetermined RSSI threshold of the wireless communication signal that the wireless relaying device 3*a* (AP-A) received from the wireless communication terminal 2. The controller 31 may also compare the RSSI value of the signal received by the wireless relaying device 3*a* (AP-A) with the RSSI value of the signal received by the wireless relaying device 3*b* (AP-B). Then, the controller 31 of the wireless relaying device 3*a* (AP-A) determines that the RSSI value (−70 dBm) of a connection request signal that the wireless relaying device 3*b* (AP-B) received from the wireless communication terminal 2 is lower than the predetermined RSSI threshold (−60 dBm) and is lower than the RSSI value (−55 dBm) of a request signal that the wireless relaying device 3*a* (AP-A) received from the wireless communication terminal 2. In this case, the wireless communication terminal 2 is in a better communication environment if the wireless communication terminal 2 is connected to the wireless relaying device 3*a* (AP-A). As a result, the controller 31 of the wireless relaying device 3*a* (AP-A) lowers the RSSI threshold from predetermined −60 dBm to −70 dBm. This makes it difficult to perform roaming processing to switch to the wireless relaying device 3*b* (AP-B).

Operation example 2 of the wireless relaying device 3 (control device) will be described by referring to FIGS. 9 and 10. In operation example 2, the RSSI value of a request signal that a non-connected wireless relaying device receives from the wireless communication terminal is lower than a predetermined RSSI threshold. FIGS. 9 and 10 are conceptual diagrams illustrating part of the operations performed by the wireless relaying device 3. The connections illustrated in FIG. 9 are similar to the connections illustrated in FIG. 7.

The controller 31 of the wireless relaying device 3*a* (AP-A) determines whether the RSSI value of a connection request signal that the wireless relaying device 3*b* (AP-B) received from the wireless communication terminal 2 is equal to or higher than the predetermined RSSI threshold of a wireless communication signal that the wireless relaying device 3*a* (AP-A) received from the wireless communication terminal 2. The controller 31 may also compare the RSSI value of the signal received by the wireless relaying device 3*a* (AP-A) with the RSSI value of the signal received by the wireless relaying device 3*b* (AP-B). As a result, the controller 31 of the wireless relaying device 3*a* (AP-A) determines that the RSSI value (−55 dBm) of the connection request signal that the wireless relaying device 3*b* (AP-B)

received from the wireless communication terminal 2 is higher than the predetermined RSSI threshold (−60 dBm) and is higher than the RSSI value (−70 dBm) of the signal that the wireless relaying device 3*a* (AP-A) received from the wireless communication terminal 2. In this case, the wireless communication terminal 2 is in a better communication environment if the wireless communication terminal 2 is connected to the wireless relaying device 3*b* (AP-B). As a result, the controller 31 of the wireless relaying device 3*a* (AP-A) increases the RSSI threshold associated with the wireless relaying device 3*a* (AP-A) from predetermined −60 dBm to −50 dBm. This makes it easy to perform roaming processing to switch to the wireless relaying device 3*b* (AP-B).

Figure 17:
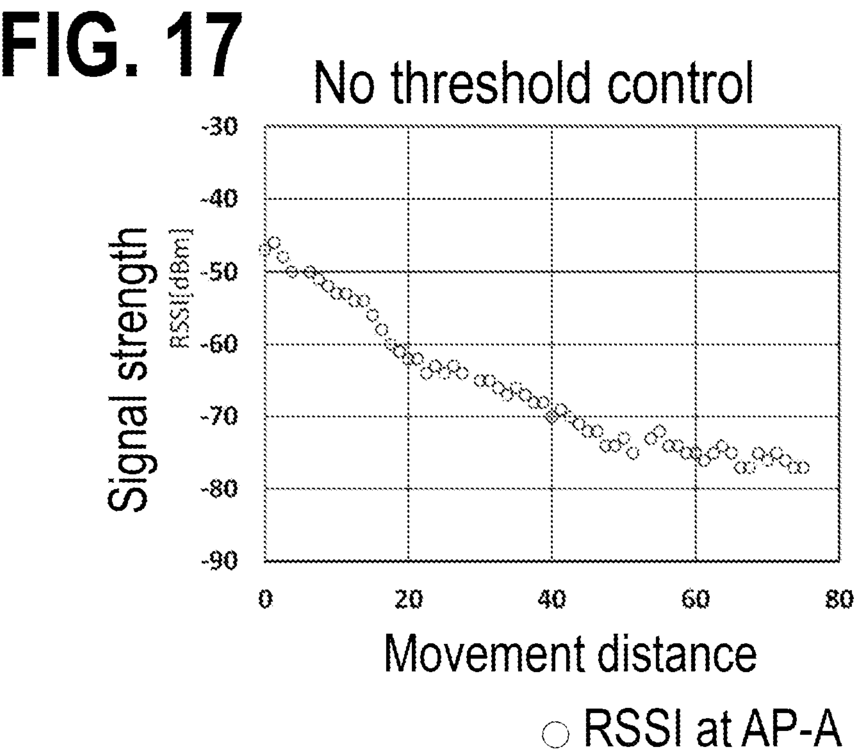
FIG. 17 is a graph showing change in signal strength plotted against movement distance.
Figure 18:
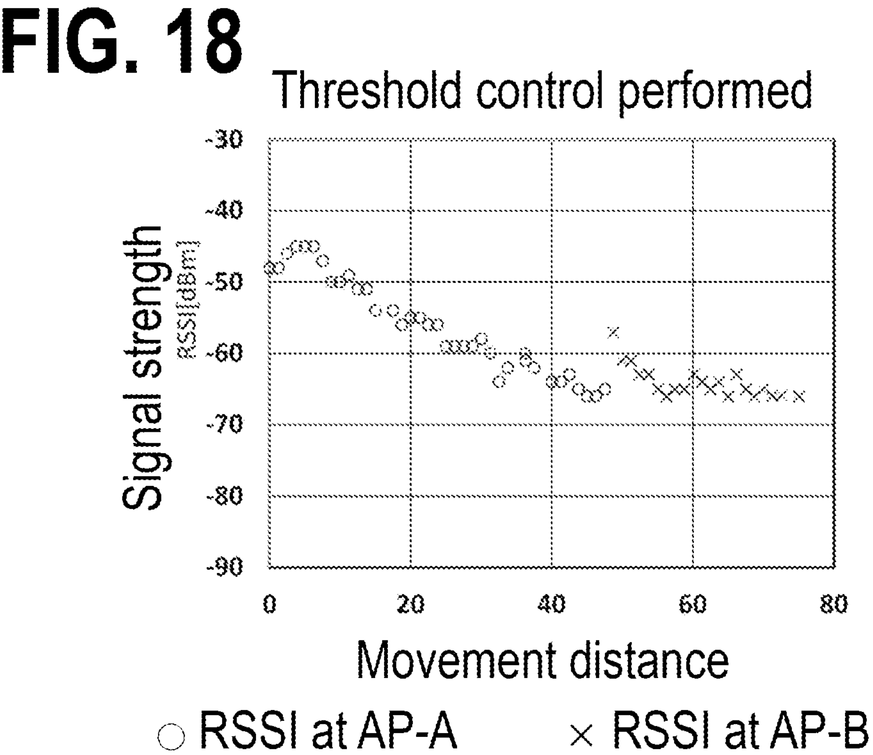
FIG. 18 is a graph showing change in signal strength plotted against movement distance.

FIGS. 17 and 18 are graphs each showing change in signal strength plotted against movement distance. The horizontal axis of each graph denotes movement distance from where the wireless relaying device 3*a* is positioned, and the vertical axis of each graph denotes signal strength. FIG. 17 illustrates an example in which the signal strength threshold was not controlled and no roaming processing was performed. FIG. 18 illustrates an example in which the signal strength threshold was controlled in accordance with the first embodiment and roaming processing was performed. As illustrated in FIG. 17, if no roaming processing is performed, the signal strength continues decreasing. In contrast, using the first embodiment ensures that roaming processing is performed during movement of the wireless communication terminal to increase the signal strength even during movement of the wireless communication terminal. This enables the wireless communication terminal to engage in reliable wireless communication.

In this embodiment, the threshold of the signal strength (RSSI value) of the signal received by the wireless relaying device 3 is adjusted to enable the wireless communication terminal 2 to establish communication connection with the wireless relaying device 3 that is in a better communication environment. This eliminates or minimizes such a situation that the wireless communication terminal 2 is connected to a distant wireless relaying device 3 that provides a lower signal strength, enabling the wireless communication terminal 2 to establish reliable wireless communication irrespective of environmental conditions.

In an embodiment, a communication control is performed based on the number of roaming demands.

Figure 11:
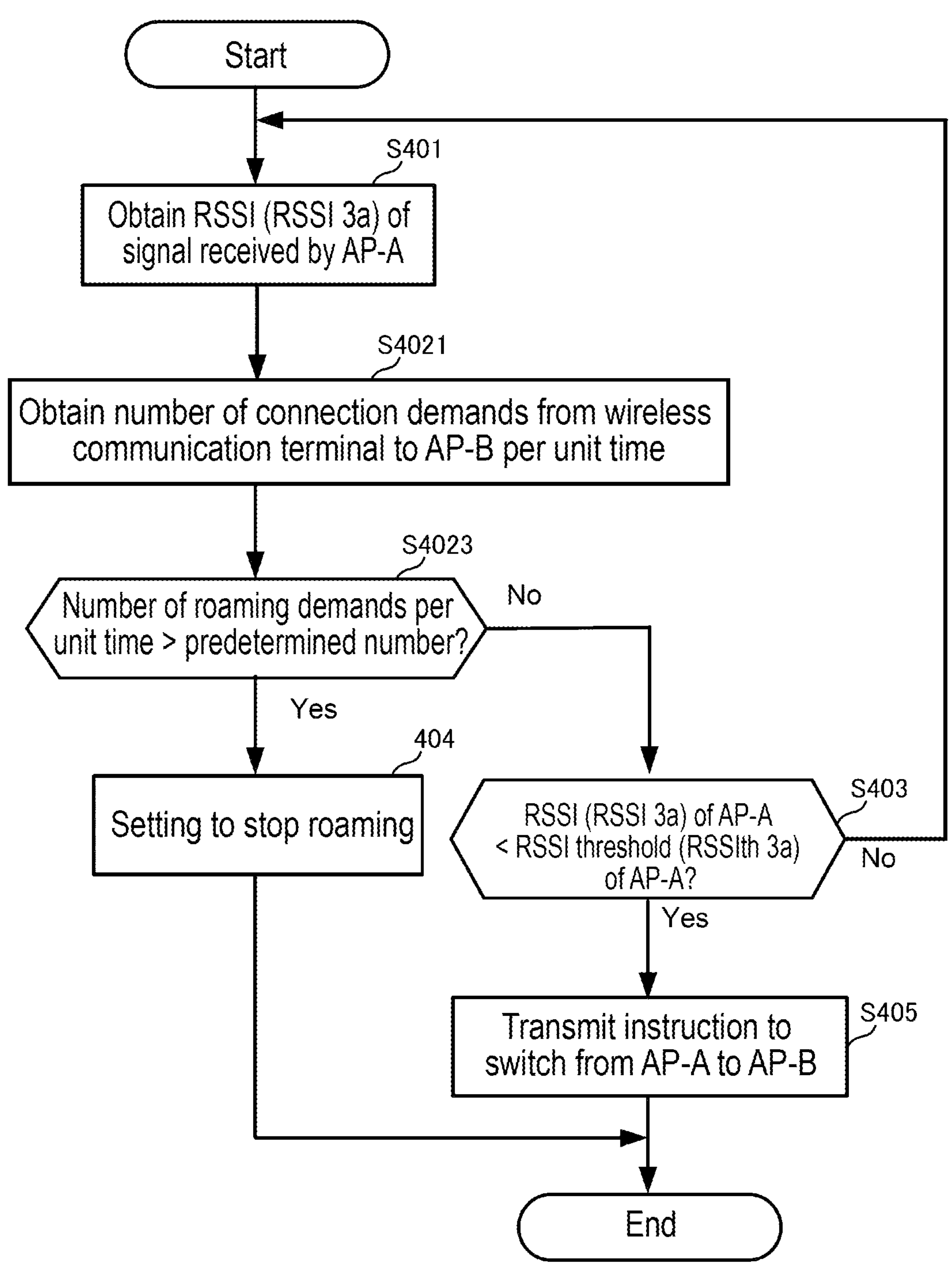
FIG. 11 is a flowchart of communication control processing.

FIG. 11 is a flowchart of communication control according to this embodiment. The controller 31 of the wireless relaying device 3*a* obtains the RSSI value of a wireless communication signal that the wireless relaying device 3*a* received from the wireless communication terminal 2 (step S401). Next, the controller 31 obtains the number of connection demands transmitted from the wireless communication terminal 2 to the wireless relaying device 3*b* per unit time (step S4021).

Next, the controller 31 determines the number of connection demands transmitted from the wireless communication terminal 2 to the wireless relaying device 3*b* per unit time (step S4023). In a case where the number of connection demands transmitted from the wireless communication terminal 2 to the wireless relaying device 3*b* per unit time greater than a predetermined transmission number (Yes at step S4023), the controller 31 performs a setting to stop roaming (step S404). After step S404, the communication control processing may end, or the procedure may return to the processing at S401.

In a case where the number of connection demands transmitted from the wireless communication terminal 2 to the wireless relaying device 3*b* per unit time is smaller than the predetermined transmission number (No at step S4023), the controller 31 compares the signal strength RSSI 3*a* (which is associated with the wireless relaying device 3*a*) with the threshold RSSIth 3*a* of the signal strength RSSI 3*a* (which is associated with the wireless relaying device 3*a*) (step S403). The processing that follows is similar to the processing at step S303.

Figure 12:
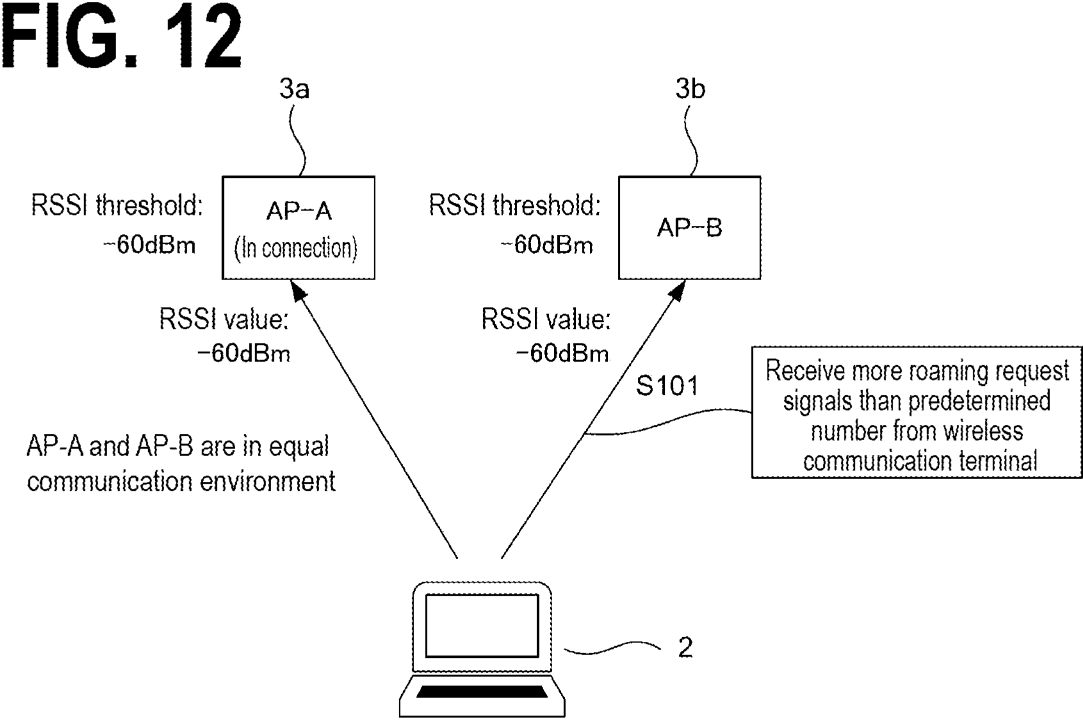
FIG. 12 is a conceptual diagram illustrating operation example 3.
Figure 13:
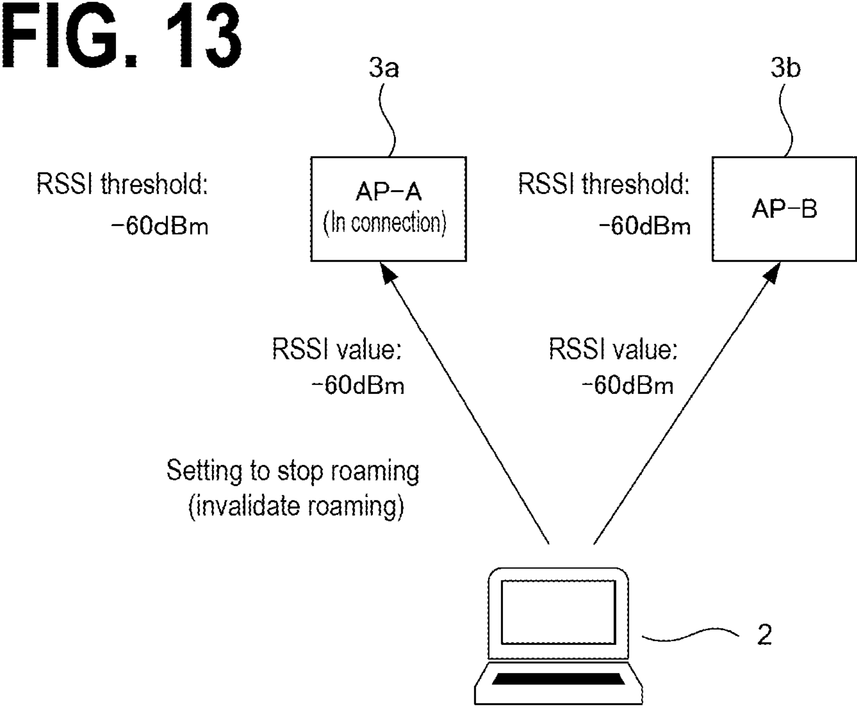
FIG. 13 is a conceptual diagram illustrating operation example 3.

Operation example 3 of the wireless relaying device 3 (control device) will be described by referring to FIGS. 12 and 13. In operation example 3, the RSSI value of a connection request signal that a non-connected wireless relaying device receives from the wireless communication terminal is equal to a predetermined RSSI threshold. FIGS. 12 and 13 are block diagrams illustrating part of the operations performed by the wireless relaying device 3. The connections illustrated in FIG. 12 are similar to the connections illustrated in FIG. 7.

The controller 31 of the wireless relaying device 3*a* determines whether the RSSI value of a connection request signal that the wireless relaying device 3*b* (AP-B) received from the wireless communication terminal 2 is equal to or higher than the predetermined RSSI threshold of a wireless communication signal that the wireless relaying device 3*a* received from the wireless communication terminal 2. Then, the controller 31 of the wireless relaying device 3*a* (AP-A) determines that the RSSI value (−60 dBm) of the request signal received from the wireless communication terminal 2 is equal to the predetermined RSSI threshold (−60 dBm). The controller 31 of the wireless relaying device 3*a* (AP-A) also determines that the RSSI value (−60 dBm) of a connection request signal that the wireless relaying device 3*b* received from the wireless communication terminal 2 is equal to the RSSI value (−60 dBm) of a signal that the wireless relaying device 3*a* (AP-A) received from the wireless communication terminal 2. In this case, the wireless relaying device 3*a* (AP-A) and the wireless relaying device 3*b* (AP-B) are in similar communication environments, and there may be a case where the wireless relaying device 3*b* (AP-B) receives more connection request signals than the predetermined transmission number from the wireless communication terminal 2. If roaming processing is performed in this state, then the wireless communication terminal 2 transmits a connection request signal to the wireless relaying device 3*a*, which may cause a high frequency of roaming. In light of this, the controller 31 performs a setting to stop roaming (invalidate roaming) (step S404).

This embodiment ensures that reliable wireless communication is established irrespective of environmental conditions. The second embodiment also ensures that repetition of roaming processing (to connect or disconnect communication) is eliminated or minimized, leading to a decrease in processing load.

An embodiment in which communication is controlled based on the time that passed after roaming processing will be described.

Figure 14:
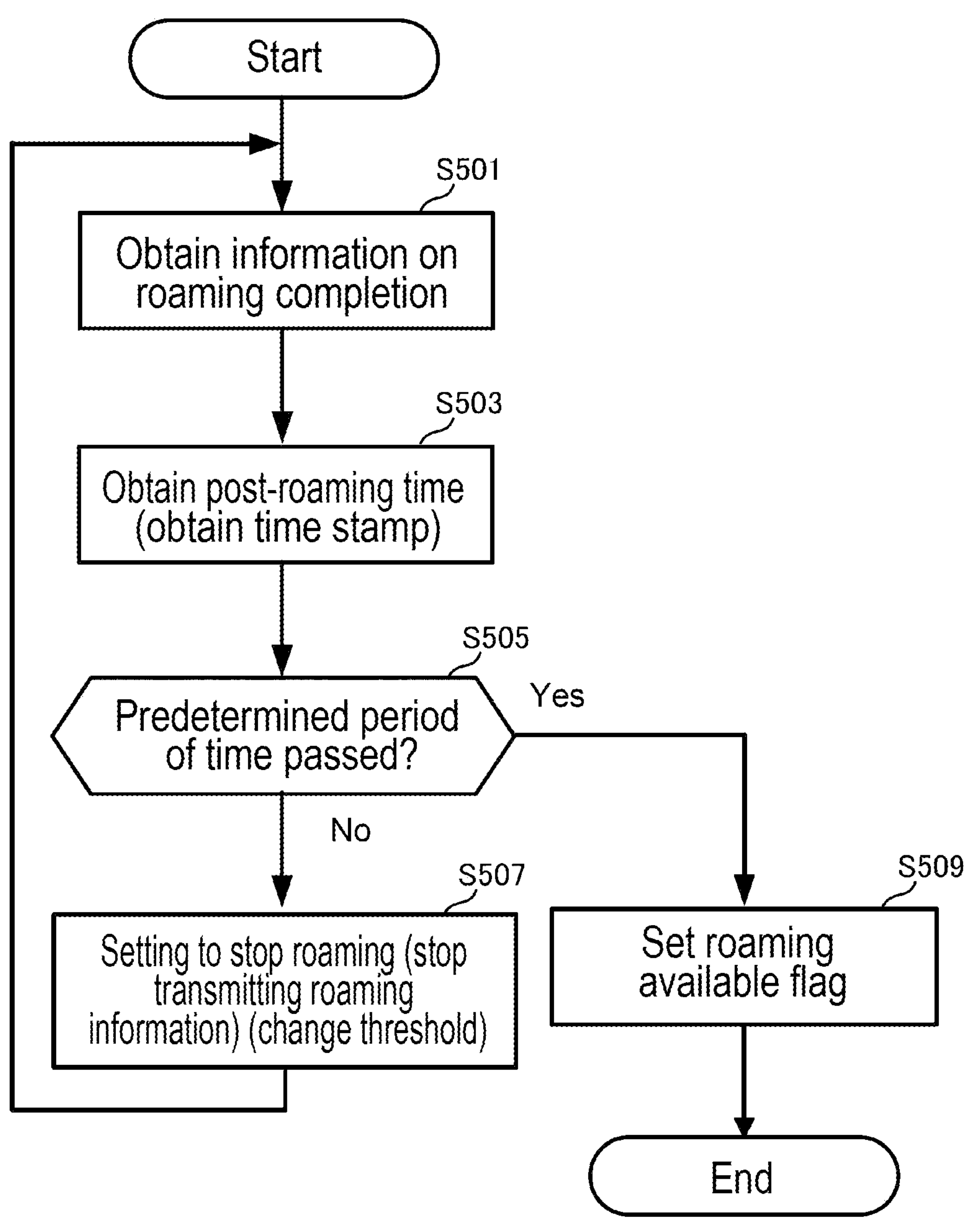
FIG. 14 is a flowchart of communication control processing.

FIG. 14 is a flowchart of communication control according to this embodiment. As illustrated in FIG. 14, the controller 31 obtains connection completion (roaming completion) information indicating that the connection between the wireless relaying device 3*a* and the wireless communication terminal 2 has been completed (step S501). Then, the controller 31 obtains time information (time stamp) indicating the time when the roaming processing was completed (the connection started) (step S503).

Then, the controller 31 determines whether the time stamp indicates that a predetermined period of time has passed (step S505). Until the time stamp indicates that the predetermined period of time has passed (No at step S505), the controller 31 performs a setting to cause the wireless communication terminal 2 to stop roaming processing. Specifically, the controller 31 transmits a signal to instruct the wireless communication terminal 2 to stop the next roaming processing. Alternatively, the threshold RSSIth 3*a* of the signal strength RSSI 3*a* (which is associated with the wireless relaying device 3*a*) may be decreased. This ensures that the processing of roaming to the wireless relaying device 3*b* is restricted.

In contrast, in a case where the time stamp indicates that the predetermined period of time has passed (Yes at step S505), the controller 31 permits the next roaming processing. In this example, the controller 31 may set a roaming available flag. In a case where the signal strength threshold was changed at the time of the setting to stop roaming processing, it is possible to return the signal strength threshold to its pre-change value at the time of the setting to permit roaming processing.

There may be a case where the wireless communication terminal 2 is disconnected from the wireless relaying device 3*b* and connected to the wireless relaying device 3*a*. At the time of this connection switching, in this embodiment, it is possible to stop transmitting roaming-related information (for example, disconnection instruction information) to the wireless communication terminal 2 at a predetermined time (or for a predetermined period of time).

The third embodiment eliminates or minimizes repetition of roaming processing (to connect or disconnect communication) in a short period of time, ensuring a stable communication environment. The third embodiment also reduces the load on both the wireless relaying device and the wireless communication terminal in the effort of efficiently using a wireless channel.

An embodiment in which date-time information is used to set a signal strength threshold will be described.

Figure 15:
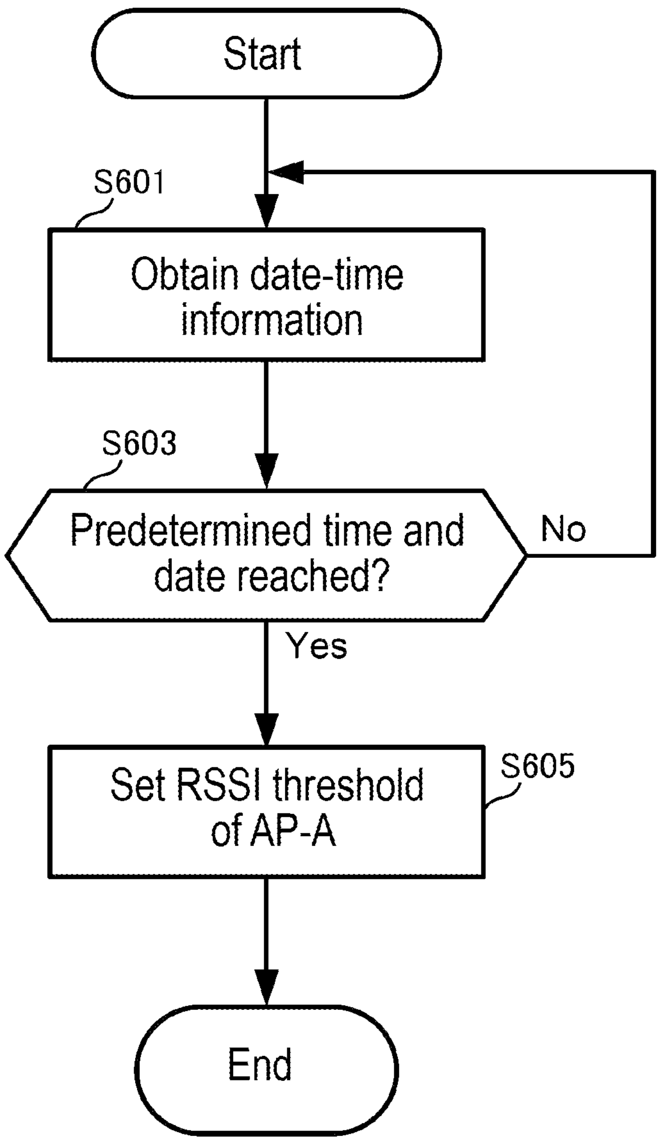
FIG. 15 is a flowchart of communication control processing.

FIG. 15 is a flowchart of communication control processing according to this embodiment. As illustrated in FIG. 15, the controller 31 obtains date-time information (step S601). The date-time information may be obtained from inside the wireless relaying device 3*a* or may be obtained from another device. The controller 31 repeats the processing at step S501 until time passes to reach a predetermined time and date (No at step S603). In a case where time has passed to reach the predetermined period of time and date (Yes at step S603), the controller 31 sets a RSSI threshold for the wireless relaying device 3*a* (step S605).

In this embodiment, a movement pattern of a wireless communication terminal may be recorded on a day-of-week basis or a time-zone basis. The signal strength threshold is set based on a movement pattern of the wireless communication terminal recorded on a day-of-week basis or a time-zone basis. This ensures that the wireless communication terminal operates in a reliable communication environment.

Figure 16:
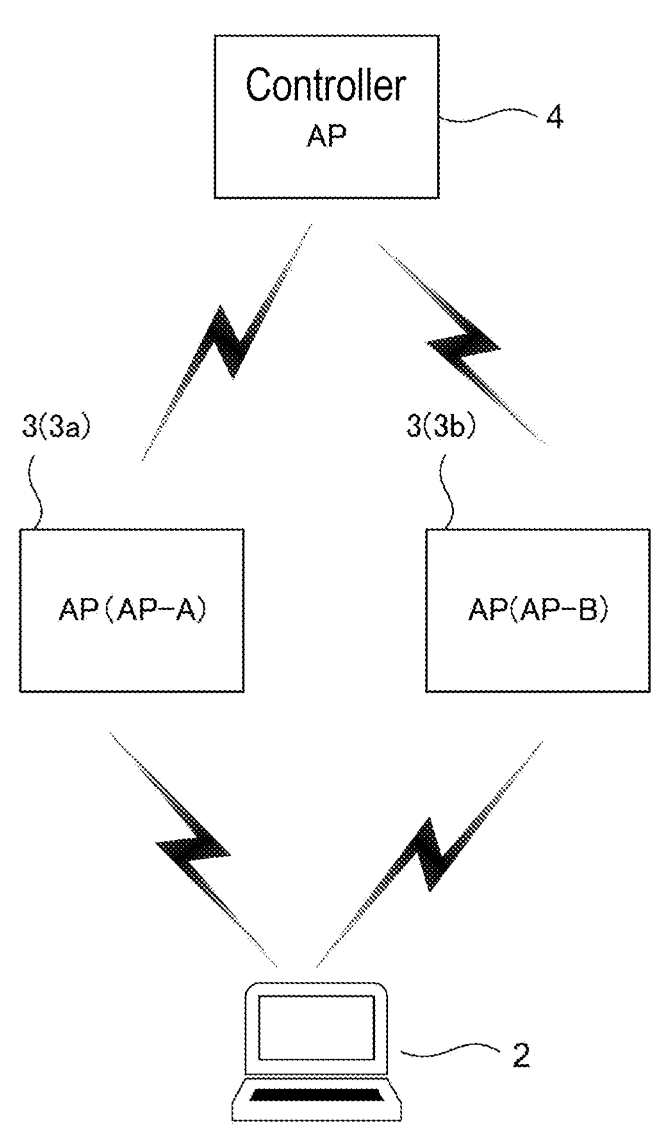
FIG. 16 is an illustration of a configuration of a wireless communication system.

In an embodiment, the wireless communication system 1 includes the plurality of wireless relaying devices 3*a* and 3*b*. This configuration, however, is not intended in a limiting sense. FIG. 16 is an illustration of a configuration of a wireless communication system 1A.

As illustrated in FIG. 16, the wireless communication system 1A may include a wireless control device 4, in addition to the wireless relaying devices 3*a* and 3*b*. In this embodiment, the number of wireless relaying devices 3 may be three or more. While the wireless control device 4 controls the wireless relaying device 3*a* and the wireless relaying device 3*b*, the wireless control device 4 may have characteristics identical or similar to these wireless relaying devices 3 in terms of its device type. The wireless control device 4 may be a wireless LAN network device such as an access point, a router, and a firewall. In this embodiment, the wireless control device 4 has a function to control a plurality of wireless relaying devices 3. As such, the wireless control device 4 may be referred to as a controller access point (controller AP). Also, the plurality of wireless relaying devices 3 controlled by the controller access point each may be referred to as member access point.

In this embodiment, the controller of the wireless control device 4 has functions similar to the functions of the wireless relaying device 3*a* according to the previous embodiments.

In previous embodiments, the signal strength (RSSI) may be obtained in the form of a cumulative total average value of the signal strength (RSSI). This minimizes the influence of fluctuations in signal strength and/or temporary degradation of the radio wave environment.

Also in the first embodiment of the present disclosure, the signal strength (RSSI) value may be a moving average value of the signal strength (RSSI), instead of its cumulative total average value. In a case where the moving average value is on the decrease, it is possible to determine that the wireless communication terminal 2 is moving in a direction away from the wireless relaying device 3*a*, and to control the threshold.

Also in the first embodiment of the present disclosure, the threshold may be controlled based on fluctuations in the obtained signal strength (RSSI) over a certain time period of time. Specifically, signal strength (RSSI) is measured over a predetermined period, and an approximation expression for the measured signal strength (RSSI) is determined; concurrently, a differential value of the measured signal strength is calculated. In a case where the differential value is negative, it is possible to determine that the wireless communication terminal 2 is moving in a direction away from the wireless relaying device 3*a*, and to control the threshold.

Also in the first embodiment of the present disclosure, a comparison has been described using the wireless relaying device 3*a* or the wireless relaying device 3*b*, the signal (RSSI), and the signal strength threshold associated with the wireless relaying device 3*a*. The signal strength threshold will not be limited to a single value but may be a certain range.

In the first embodiment of the present disclosure, a threshold controllable flag is set in a case where a time stamp satisfies a predetermined condition, the signal strength (RSSI) of the signal received by the wireless relaying device 3*a* satisfies a predetermined condition, and the connection request signal transmission number satisfies a predetermined condition. This configuration, however, is not intended in a limiting sense. A threshold controllable flag may be set in a case where at least one condition is satisfied.

Also in the first embodiment of the present disclosure, the threshold-control initial setting processing S100 is performed. This configuration, however, is not intended in a limiting sense. The threshold-control initial setting processing S100 may be omitted once the wireless relaying device is set to a threshold controllable state.

Also in the first embodiment of the present disclosure, the threshold control processing S200 is performed. This configuration, however, is not intended in a limiting sense. The threshold control processing S200 may be omitted in a case where the signal strength of the signal received by the wireless relaying device 3*b* is not notified.

Also in the first embodiment of the present disclosure, a time stamp is obtained at steps 103 and 105. This configuration, however, is not intended in a limiting sense. Steps S103 and S105 may be implemented by processing using a timer with the time of obtaining the connection information as starting point.

Also in the first embodiment of the present disclosure, a comparison may be performed using channel usage rate, in addition to or instead of signal strength. Specifically, it is possible to select a wireless relaying device 3 with a low channel usage rate and issue a roaming (connection switching) instruction.

As has been described hereinbefore, the above-described embodiments each provides a control device including a controller. The following configurations may also be applicable.

In the apparatus according to any one of the above-described embodiments, in a case that the signal strength of the second signal is higher than a value linked to the first threshold, the controller may be configured to change the first threshold to the second threshold so that the second threshold is higher than the first threshold.

In the apparatus according to any one of the above-described embodiments, the signal strength of the second signal may include a cumulative total average value of the signal strength, and the controller may be configured to change the first threshold to the second threshold based on a relationship between the first threshold and the cumulative total average value.

In the apparatus according to any one of the above-described embodiments, in a case that a number of connection demands transmitted from the communication terminal to the second wireless relaying device within a predetermined period of time satisfies a predetermined condition, the controller may be configured to stop transmitting the first information.

In the apparatus according to any one of the above-described embodiments, the controller may be configured to obtain the first signal after a predetermined period of time has passed since the first wireless relaying device and the communication terminal were connected to each other.

In the apparatus according to any one of the above-described embodiments, the controller may be configured to stop transmitting the first information to the communication terminal upon passage of a predetermined period of time since the first wireless relaying device and the communication terminal were connected to each other.

In the apparatus according to any one of the above-described embodiments, the controller may be configured to stop transmitting the first information the communication terminal within a predetermined period of time after a connection between the communication terminal and the second wireless relaying device was switched to a connection between the communication terminal and the first wireless relaying device.

In the apparatus according to any one of the above-described embodiments, the signal strength of the first signal may include at least one of a moving average value or a differential value of the signal strength, and the controller may be configured to variably set the first threshold based on a change in the signal strength of the first signal.

In the apparatus according to any one of the above-described embodiments, the controller may be configured to obtain date-time information and set the first threshold based on the date-time information.

In the method according to any one of the above-described embodiments, in a case that the signal strength of the second signal is higher than a value linked to the first threshold, the first threshold may be changed to the second threshold so that the second threshold is higher than the first threshold.

In the method according to any one of the above-described embodiments, the signal strength of the second signal may include a cumulative total average value of the signal strength, and the first threshold may be changed to the second threshold based on a relationship between the first threshold and the cumulative total average value.

In the method according to any one of the above-described embodiments, in a case that a number of connection demands transmitted from the communication terminal to the second wireless relaying device within a predetermined period of time satisfies a predetermined condition, the first information may be stopped from being transmitted.

In the method according to any one of the above-described embodiments, the first signal may be obtained after a predetermined period of time has passed since the first wireless relaying device and the communication terminal were connected to each other.

In the method according to any one of the above-described embodiments, the first information may be stopped from being transmitted to the communication terminal upon passage of a predetermined period of time since the first wireless relaying device and the communication terminal were connected to each other.

In the method according to any one of the above-described embodiments, the first information may be stopped from being transmitted to the communication terminal within a predetermined period of time after a connection between the communication terminal and the second wireless relaying device was switched to a connection between the communication terminal and the first wireless relaying device.

In the method according to any one of the above-described embodiments, the signal strength of the first signal may include at least one of a moving average value or a differential value of the signal strength, and the first threshold may be variably set based on a change in the signal strength of the first signal.

The method according to any one of the above-described embodiments further include obtaining date-time information and setting the first threshold based on the date-time information.

While embodiments have been described, the embodiments are intended as illustrative only and are not intended to limit the scope of the present disclosure. It will be understood that the present disclosure can be embodied in other forms without departing from the scope of the present disclosure, and that other omissions, substitutions, additions, and/or alterations can be made to the embodiments. Thus, these embodiments and modifications thereof are intended to be encompassed by the scope of the present disclosure. The scope of the present disclosure accordingly is to be defined as set forth in the appended claims.

What is claimed is:

1. An apparatus comprising:

a control device having a controller that is configured to:

obtain a first signal transmitted from a communication terminal connected to a first wireless relaying device;

obtain a second signal transmitted from the communication terminal to a second wireless relaying device different from the first wireless relaying device;

based on a relationship between a signal strength of the second signal and a predetermined first threshold of a signal strength of the first signal, change the first threshold to a second threshold different from the first threshold; and based on a relationship between the second threshold and the signal strength of the first signal, transmit, to the communication terminal, first information regarding connection switching.

2. The apparatus according to claim 1, wherein in a case that the signal strength of the second signal is higher than a value linked to the first threshold, the controller is configured to change the first threshold to the second threshold, so that the second threshold is higher than the first threshold.

3. The apparatus according to claim 1, wherein the signal strength of the second signal comprises a cumulative total average value of the signal strength, and the controller is also configured to change the first threshold to the second threshold based on a relationship between the first threshold and the cumulative total average value.

4. The apparatus according to claim 1, wherein in a case that a number of connection demands transmitted from the communication terminal to the second wireless relaying device within a predetermined period of time satisfies a predetermined condition, the controller is also configured to stop transmitting the first information.

5. The apparatus according to claim 1, wherein the controller is also configured to obtain the first signal after a predetermined period of time has passed since the first wireless relaying device and the communication terminal were connected to each other.

6. The apparatus according to claim 1, wherein the controller is also configured to stop transmitting the first information to the communication terminal upon passage of a predetermined period of time since the first wireless relaying device and the communication terminal were connected to each other.

7. The apparatus according to claim 1, wherein the controller is also configured to stop transmitting the first information to the communication terminal within a predetermined period of time after a connection between the communication terminal and the second wireless relaying device was switched to a connection between the communication terminal and the first wireless relaying device.

8. The apparatus according to claim 1, wherein the signal strength of the first signal comprises at least one of a moving average value or a differential value of the signal strength, and the controller is also configured to variably set the first threshold based on a change in the signal strength of the first signal.

9. The apparatus according to claim 1, wherein the controller is also configured to obtain date-time information and set the first threshold based on the date-time information.

10. A computer-implemented communication controlling method comprising:

obtaining a first signal transmitted from a communication terminal connected to a first wireless relaying device;

obtaining a second signal transmitted from the communication terminal to a second wireless relaying device different from the first wireless relaying device;

based on a relationship between a signal strength of the second signal and a predetermined first threshold of a signal strength of the first signal, changing the first threshold to a second threshold different from the first threshold; and based on a relationship between the second threshold and the signal strength of the first signal, transmitting, to the communication terminal, first information regarding connection switching.

11. The method according to claim 10, wherein in a case that the signal strength of the second signal is higher than a value linked to the first threshold, the first threshold is changed to the second threshold, so that the second threshold is higher than the first threshold.

12. The method according to claim 10, wherein the signal strength of the second signal comprises a cumulative total average value of the signal strength, and the first threshold is changed to the second threshold based on a relationship between the first threshold and the cumulative total average value.

13. The method according to claim 10, wherein in a case that a number of connection demands transmitted from the communication terminal to the second wireless relaying device within a predetermined period of time satisfies a predetermined condition, the first information is stopped from being transmitted.

14. The method according to claim 10, wherein the first signal is obtained after a predetermined period of time has passed since the first wireless relaying device and the communication terminal were connected to each other.

15. The method according to claim 10, wherein the first information is stopped from being transmitted to the communication terminal upon passage of a predetermined period of time since the first wireless relaying device and the communication terminal were connected to each other.

16. The method according to claim 10, wherein the first information is stopped from being transmitted to the communication terminal within a predetermined period of time after a connection between the communication terminal and the second wireless relaying device was switched to a connection between the communication terminal and the first wireless relaying device.

17. The method according to claim 10, wherein the signal strength of the first signal comprises at least one of a moving average value or a differential value of the signal strength, and the first threshold is variably set based on a change in the signal strength of the first signal.

18. The method according to claim 10, further comprising: obtaining date-time information and setting the first threshold based on the date-time information.

19. A non-transitory computer-readable storage medium storing a program which, when executed by at least one processor, causes the at least one processor to:

obtain a first signal transmitted from a communication terminal connected to a first wireless relaying device;

obtain a second signal transmitted from the communication terminal to a second wireless relaying device different from the first wireless relaying device;

based on a relationship between a signal strength of the second signal and a predetermined first threshold of a signal strength of the first signal, change the first threshold to a second threshold different from the first threshold; and based on a relationship between the second threshold and the signal strength of the first signal, transmit, to the communication terminal, first information regarding connection switching.

* * * * *